Figure 1:
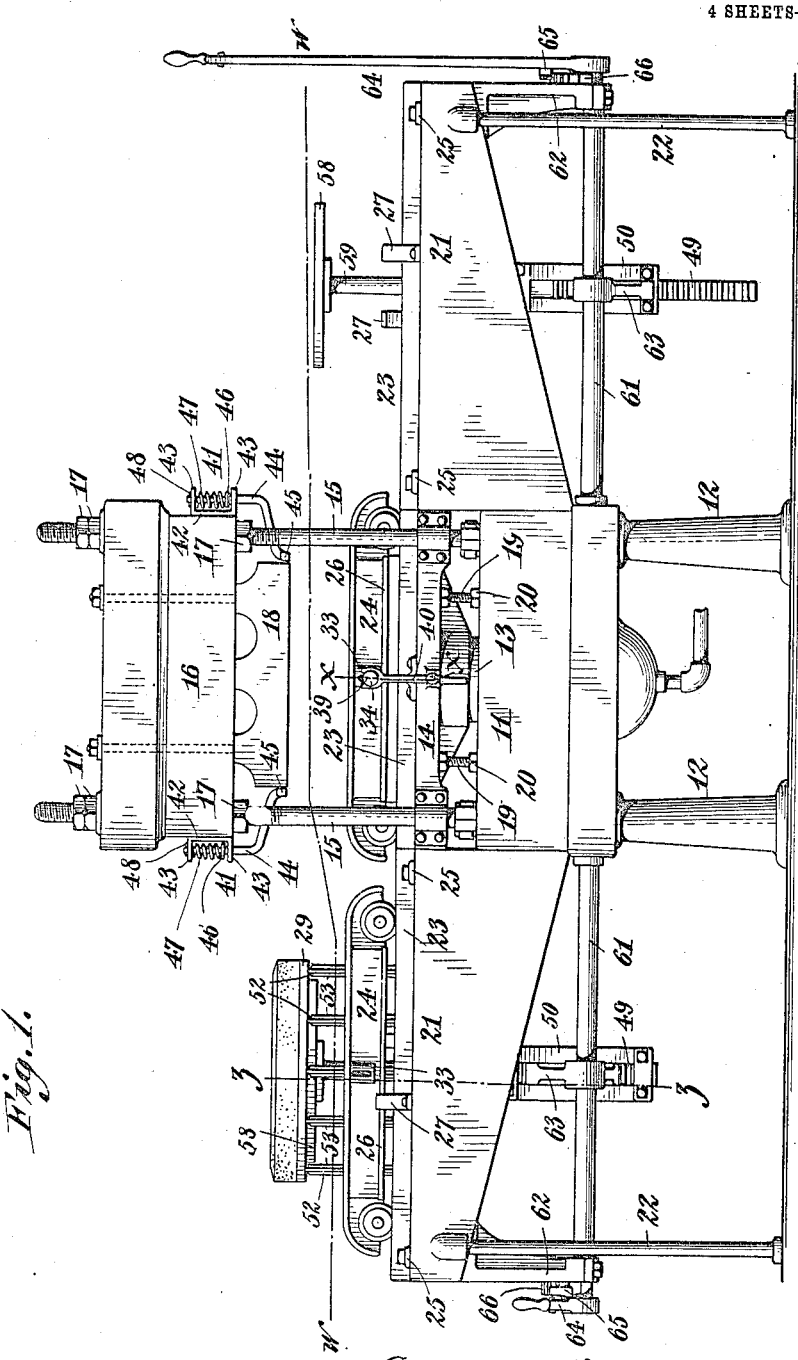

No. 831,781. PATENTED SEPT. 25, 1906.
G. F. FISHER.
MACHINE FOR MOLDING BUILDING BLOCKS.
APPLICATION FILED APR. 24, 1905.
4 SHEETS—SHEET 1.

WITNESSES: George F. Fisher, INVENTOR
BY
Emil Neuhart
ATTORNEY

No. 831,781. PATENTED SEPT. 25, 1906.
G. F. FISHER.
MACHINE FOR MOLDING BUILDING BLOCKS.
APPLICATION FILED APR. 24, 1905.
4 SHEETS—SHEET 2.
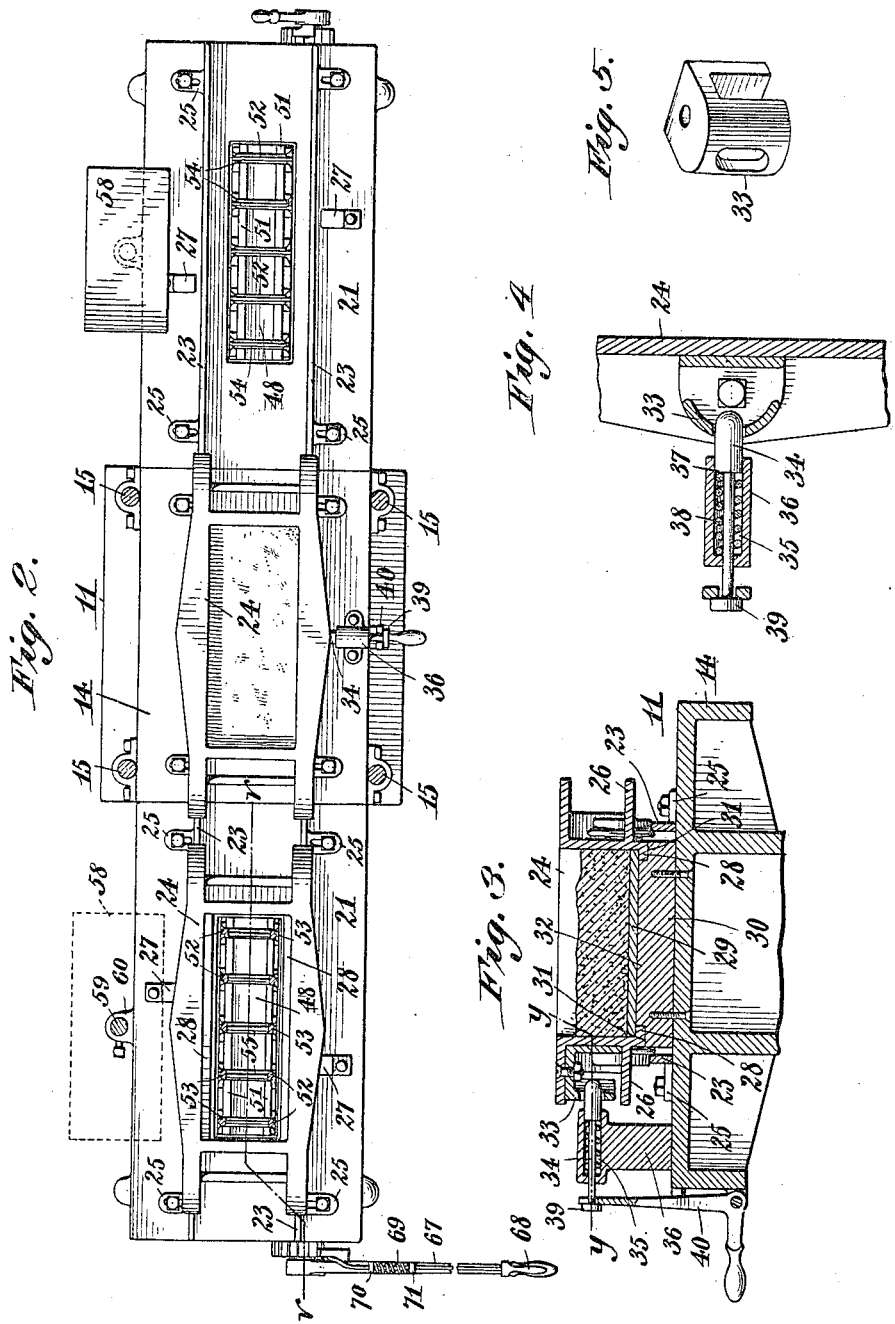
WITNESSES: George F. Fisher, INVENTOR
Julius Lanker
Harry Harris
BY
Emil Neuhart
ATTORNEY
THE NORRIS PETERS CO., WASHINGTON, D. C.

No. 831,781. PATENTED SEPT. 25, 1906.
G. F. FISHER.
MACHINE FOR MOLDING BUILDING BLOCKS.
APPLICATION FILED APR. 24, 1905.
4 SHEETS—SHEET 3.
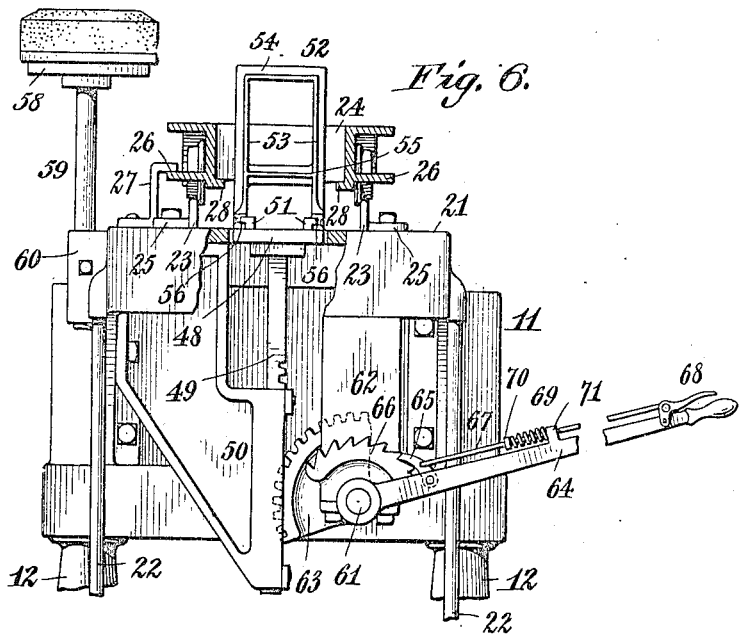
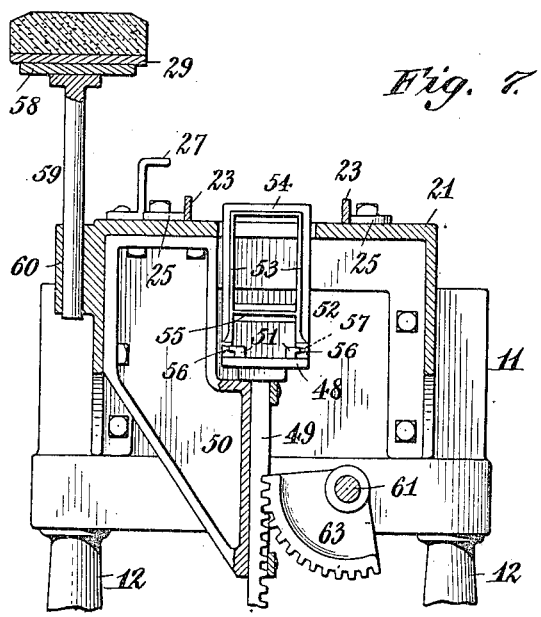
WITNESSES:
Julius Lankes
Harry Harris
George F. Fisher, INVENTOR
BY
Emil Neuhart
ATTORNEY

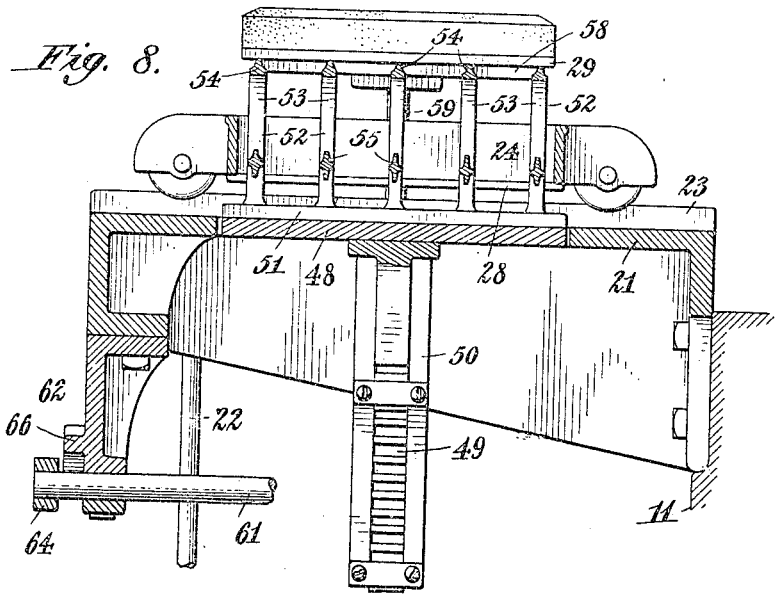
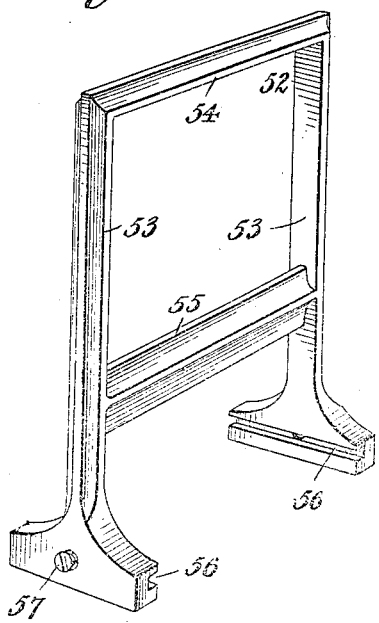
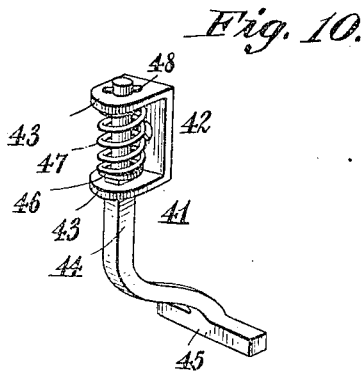

UNITED STATES PATENT OFFICE.

GEORGE F. FISHER, OF NORTH TONAWANDA, NEW YORK.

MACHINE FOR MOLDING BUILDING-BLOCKS.

No. 831,781.　　　　Specification of Letters Patent.　　　Patented Sept. 25, 1906.

Application filed April 24, 1905. Serial No. 257,176.

*To all whom it may concern:*

Be it known that I, GEORGE F. FISHER, a citizen of the United States, residing at North Tonawanda, in the county of Niagara and State of New York, have invented certain new and useful Improvements in Machines for Molding Building-Blocks, of which the following is a specification.

This invention relates to improvements in machines for molding composition blocks; and its primary object is the production of a simple, quick-acting, and effective machine particularly designed for molding blocks and slabs from plastic material for building purposes.

Other objects are to provide rigid extensions or extension-platforms on opposite sides of the pressure-platform which afford convenient supports to permit of filling the molds and of ejecting the molded blocks from the latter, to provide coinciding tracks on the pressure-platform and its extensions, to provide means for centering the mold on the platform and for holding the same in proper position underneath the impression-die, to equip the press with means for adjusting the pressure-platform relative to its extensions, and to provide means for releasing the mold from the impression-die during the initial downward movement of the pressure-platform supporting said mold.

Further objects are to provide means for ejecting the molded blocks from the molds while retaining the latter on the extension-platforms and to otherwise improve on molding-machines of this type now in use.

With these ends in view my invention consists in the construction, arrangement, and combination of parts to be hereinafter described, and particularly pointed out in the appended claims.

In the drawings, Figure 1 is a front elevation of a molding-machine embodying my invention. Fig. 2 is a horizontal section taken on line *w w*, Fig. 1. Fig. 3 is an enlarged vertical section taken on line *x x*, Fig. 1, looking toward the left. Fig. 4 is an enlarged horizontal section taken on line *y y*, Fig. 3. Fig. 5 is a detached perspective view of the lock-cam on a mold. Fig. 6 is an end view of one of the extension-platforms, part being broken away to show the block-ejecting mechanism and the mold, the latter being shown in section and the ejecting mechanism elevated. Fig. 7 is an enlarged transverse section taken on line *z z*, Fig. 1, the mold being removed and the block-ejecting mechanism lowered. Fig. 8 is an enlarged longitudinal section taken on line *v v*, Fig. 2, the ejecting mechanism being elevated with a molded block thereon. Fig. 9 is an enlarged detached perspective view of one of the ejectors. Fig. 10 is an enlarged detached perspective view of one of the mold-releasing devices.

Referring to the drawings in detail, like numerals of reference refer to like parts in the several figures.

The reference-numeral 11 designates the press portion of the machine, which consists of a main or foundation casting supported on standards 12 and equipped with a hydraulic ram 13, having secured to its upper end the pressure-platform 14. Said platform is therefore vertically movable and guided in its movements on upright guide-rods 15, which are secured to the foundation-casting and carry a head 16, adjustable thereon by means of nuts 17, applied to the upper threaded ends of said rods and bearing against the upper and under sides of said head.

18 designates the impression-die, which is secured to the head 16 in any practicable manner so that it may be readily removed and a die of different size or design applied to said head.

Adjusting or stop bolts 19 take into the upper face of the foundation and serve to regulate the extent of downward movement of the pressure-platform. These bolts support the platform and are held in any adjusted position by lock-nuts 20. Side extension-platforms 21 are provided, which are suitably secured at their inner ends to the foundation-casting and are supported at their outer ends on standards 22. This construction provides an extended platform having a vertically-movable intermediate portion and opposite fixed extensions, the bolts 19 serving as a means to adjust said intermediate portion so as to retain the same on a level with the extensions at all times. A perfectly even bed is thus provided, to which I secure rails 23, that form a track on which wheeled molds or mold-cars 24 ride. This track is formed in three sections, two of which are secured to the extension-platforms and the remaining one affixed to the pressure-platform. The rails of the track are furnished with slotted lugs 25, through which bolts pass that take into the bed, and in this manner provision is made for conveniently adjusting the track to a wider or narrower gage, as may be required.

The wheeled molds are each provided with lateral flanges 26, and on the extension-platforms adjacent the tracks and on opposite sides of the latter angular retainer-bars 27 are secured, under which the flanges of the molds pass. The sides of each mold are provided with inwardly-extending flanges 28 at their lower edges, on which the removable bottom 29 is supported. The filling of the molds with plastic material is done when the molds are on the extension-platforms, and after being filled the mold is pushed onto the pressure-platform, which is provided with a pressure-block 30, having its corners cut away, as at 31, to fit the lower flanged portions of the mold sides, the narrow upper portion 32 of the pressure-block therefore entering the mold and providing a solid support for the mold-bottom.

It is necessary to center the mold with reference to the impression-die, and this I do by securing to one side of each mold a slotted lock-cam 33, with which a slide-bolt 34 is adapted to engage. Said slide-bolt passes through a pocket 35 in the upper end of a standard 36, secured to the pressure-platform, and between a shoulder 37 on said bolt and the inner end of said pocket a spiral spring 38 is confined. This spring surrounds the said bolt and serves to hold the same inwardly projected, so that when a mold is pushed onto the pressure-platform the lock-cam will engage said slide-bolt and cause the mold to be automatically locked thereby. The outer end of said slide-bolt is provided with a head or enlargement 39, and straddling said bolt in rear of said head is the forked end of a bell-crank lever 40, on actuation of which the slide-bolt is withdrawn from the lock-cam on the mold and the latter released to permit of its being pushed onto one of the extension-platforms.

When a mold is pushed onto the pressure-platform, the hydraulic ram is placed into action and the platform and mold thereon elevated, thereby causing the impression-die on the head to enter the mold and compress the material therein. By reason of the sides and ends of the molds surrounding the die during the action of compressing the material in the mold there is a tendency on the part of the latter to bind and remain suspended on the die when lowering the pressure-platform. To obviate this, I provide spring-controlled releasing devices 41, which are secured to opposite sides of the head. Each releasing device comprises a bracket 42, having two outstanding ears 43, in which vertically-movable pressure-rods 44 are guided. The lower ends of said rods are directed inward and terminate in juxtaposition to the impression-die. Each of said rods has at its lower end a horizontal bearing member 45 and its upper end reduced in thickness to provide a shoulder, against which is seated a washer 46. Between the latter and the upper ear of the bracket supporting the rod a spiral spring 47 is held. A pin 48 is passed through each pressure-rod above its supporting-bracket, with the ends thereof projecting therefrom and bearing against said bracket to prevent disengagement of the rod from the latter. When a mold is elevated, the upper edges of the end walls thereof are brought in contact with the bearing members of the spring-controlled pressure-rods and cause said rods to yield under the power of the hydraulic ram which elevates the pressure-platform supporting said mold. When the material in the mold is pressed, said platform is lowered and the pressure-rods, through the efforts of the springs surrounding the same, cause the mold to free itself from the die and descend with the platform.

After the blocks are formed the molds are pushed to their respective extension-platforms and held thereon by the retainer-bars 27 while the molded blocks are being ejected therefrom. For this purpose I equip with each extension-platform vertically-movable ejecting devices consisting of a support 48, secured to the upper end of a gear-rack 49, guided for movement in a bracket 50, secured to the under side of the platform. Each of the supports 48 is equipped with parallel angle guide-strips 51, on which are adjustably arranged block-ejectors 52. Each ejector is in the form of an open frame comprising vertical bars 53, connected at their upper ends by a cross-bar 54 and by a cross-bar 55 intermediate their ends. The ejectors are grooved near their lower ends, as at 56, to fit the guide-strips, and are therefore adjustable lengthwise of said strips. In order to retain the ejectors in any adjusted position, set-screws 57 are passed through the same and impinge against the guide-strips. In this manner the molded block, with the mold-bottom, can be easily removed from the mold, the ejectors providing the proper support throughout the length of the mold-bottom to prevent deflection of the latter, which would tend to break the block. As shown in Fig. 6, the upper ends of the ejectors when elevated are on a level with supports 58, which are affixed to the upper ends of rods 59, adjustable in sockets 60, formed on the extension-platform. When the block is ejected from the mold and elevated, it can be easily slid onto the adjacent support 58, from which it may be taken and placed on a rack for setting and drying.

For actuating the ejecting devices I equip the machine with rock-shafts 61, which are journaled in the foundation-casting and in brackets 62 at the ends of the extension-platforms or in any other approved manner.

Segment-gears 63 are secured to said shafts and mesh with the gear-racks 49. An operating-lever 64 is secured to each shaft at the outer end thereof and has secured thereon a dog 65, adapted to engage a sector 66, so as to lock the shaft in any desired position, whereby the ejectors when elevated are locked. The dogs 65 are actuated by rods 67, extending along the operating-levers and having their upper ends attached to a releasing-lever 68, as is common in operating-levers of this type. In order to hold the dogs 65 in engagement with the sectors at all times, springs 69 are provided, which surround the rods 67 and are held between collars 70 on the latter and lugs 71 on the operating-levers.

From the foregoing it is apparent that with a molding-machine embodying my invention composition blocks can be quickly and conveniently molded and that the capacity of the machine is greatly increased over machines of this class now in use.

By equipping the machine with extension-platforms the mold can be quickly and conveniently filled and the molded blocks as readily ejected therefrom, the material in one mold being pressed while the molded block in the other mold is ejected and the mold refilled.

Having thus described my invention, what I claim is—

1. In a machine for molding building-blocks, the combination of a press, a mold for containing the material to be molded, fixed extensions onto either of which the mold is to be moved after a block is molded, and means for ejecting the molded block from the mold after the latter has been moved onto either of said fixed extensions.

2. In a machine for molding building-blocks, the combination with a foundation-casting and an impression-die, of a vertically-movable platform supported on said casting beneath said die, a fixed platform secured to said foundation-casting on a level with said movable platform when in its normal position, a mold for containing the material to be compressed, and an ejecting device movable upward through the fixed platform to eject the molded blocks from the mold.

3. In a machine for molding building-blocks, the combination with a foundation-casting and an impression-die, of a platform comprising fixed end portions secured to said casting and a vertically-movable intermediate portion supported on the foundation-casting beneath said die, wheeled molds for containing the material to be compressed, and ejecting devices passing up through the fixed end portions of the platform to eject the molded block from the mold.

4. In a machine for molding building-blocks, the combination with a foundation-casting and an impression-die supported above said casting, of a pressure-platform normally supported on the foundation-casting, opposite extension-platforms held on a level with said pressure-platform when in its normal position, parallel and alined rails secured to said platforms, wheeled molds for containing the material to be compressed and riding on said rails, and ejecting devices movable through openings in said extension-platforms to eject the molded blocks from the molds.

5. In a machine for molding building-blocks, the combination with a foundation-casting and an impression-die supported above said casting, of a vertically-movable pressure-platform supported on said casting beneath said die, an extension-platform, alined rails on said platforms, a wheeled mold riding said rails, and means for automatically locking said mold in proper position beneath the die when moved onto the pressure-platform.

6. In a machine for molding building-blocks, the combination with a foundation-casting and an impression-die supported above said casting, of a vertically-movable pressure-platform supported on said casting beneath said die, an extension-platform level with the pressure-platform when in its normal position, a track on said platforms, a mold riding said track and having a slotted cam-lock, and a spring-forced slide-bolt carried on the pressure-platform and adapted to enter the slot in the cam-lock.

7. In a machine for molding building-blocks, the combination with a foundation-casting and an impression-die supported above said casting, of a vertically-movable pressure-platform supported on said casting beneath said die, an extension-platform level with the pressure-platform when in its normal position, a track on said platform, a mold riding said track and having a slotted cam-lock, a spring-forced slide-bolt carried on the pressure-platform and adapted to enter the slot in the cam-lock, and a lever for releasing said slide-bolt from said cam-lock.

8. In a machine for molding building-blocks, the combination with a foundation-casting and an impression-die supported above said casting, of a platform having a vertically-movable portion supported on said casting beneath said die and a fixed portion held on a level with the movable portion when in its normal position, a track on said platform, a mold movable on said track, an ejecting device beneath the fixed portion of the platform adapted to eject the molded block, and means for holding the mold to the platform while ejecting the molded block therefrom.

9. In a machine for molding building-blocks, the combination with a foundation-casting and an impression-die supported above said casting, of a platform having a vertically-movable portion supported on said casting beneath said die and a fixed portion held on a level with the movable portion when in its normal position, a track on said platform, a mold movable on said track and having an extension thereon, an ejecting device beneath the fixed portion of the platform adapted to eject the molded block, and retainer-bars having inward extensions at the upper ends underneath which the extensions of the mold bear when ejecting the block from the mold.

10. In a machine for molding building-blocks, the combination with a foundation-casting and an impression-die supported above said casting, of a platform having a vertically-movable portion supported on said casting beneath said die and a fixed portion held on a level with the movable portion when in its normal position, a track on said platform, a mold movable on said track, an ejecting device beneath the fixed portion of the platform adapted to eject and elevate the molded block from the mold, and elevated supports onto which the molded block is slid from said ejecting device.

11. In a machine for molding building-blocks, the combination with a foundation-casting and an impression-die, of a vertically-movable platform supported on said casting beneath said die, a fixed support on a level with said movable platform when in its normal position, a mold for containing the material to be compressed, and an ejecting device movable upward through the fixed support to eject the molded blocks from the mold.

12. In a machine for molding building-blocks, the combination with the foundation-casting and the impression-die supported above said casting, of a platform comprising a vertically-movable intermediate portion beneath said die and fixed end portions, bolts adjustable in said foundation-casting serving to support the movable intermediate portion of the platform and for adjusting the same relative to the fixed end portions, and a mold adapted to be moved from said movable intermediate portion onto either fixed end portion, or from either fixed end portion onto said intermediate movable portion.

13. In a machine for molding building-blocks, the combination with a supported head having an impression-die secured thereto, of a mold containing the material to be compressed by said die, suitable power mechanism, and automatic releasing means for separating the mold and die when compression of the material is stopped.

14. In a machine for molding building-blocks, the combination of a mold containing the material to be compressed, a die adapted to enter said mold, means for causing compression of the material in the mold, and automatic releasing means acting against the mold to separate the same from the die after the parts are relieved of pressure.

15. In a machine for molding building-blocks, the combination of a mold containing the material to be compressed, a die adapted to enter said mold, means for causing compression of the material in the mold, and spring-forced mold-releasers engaged by the mold during the compression of the material and serving to release the mold from the die after compression.

16. In a machine for molding building-blocks, the combination with a supported head having an impression-die secured thereto, of a vertically-movable platform, a mold carried on said platform, brackets secured to opposite ends of said head, shouldered rods movable in said brackets and having their lower ends terminating adjacent the ends of the die, and springs surrounding said rods and bearing with one of their ends against the brackets and with their other ends against the shoulders on said rods.

17. In a machine for molding building-blocks, the combination with a press portion, of an extension-platform having an opening therein, a vertically-movable support beneath said opening, and ejectors adjustable lengthwise on said support.

18. In a machine for molding building-blocks, the combination with a press portion, of an extension-platform having an opening therein, a vertically-movable support beneath said opening having parallel angle guide-strips secured thereto, and ejectors having grooves at their lower ends into which said strips fit.

19. In a machine for molding building-blocks, the combination with a press portion, of an extension-platform having an opening therein, a vertically-movable support beneath said opening having parallel angle guide-strips secured thereto, and ejectors comprising vertical bars connected at their upper ends by a cross-bar and having grooves in the lower ends of said vertical bars into which said guide-strips fit.

20. In a machine for molding building-blocks, the combination with a press portion, of an extension-platform having an opening therein, a vertically-movable support beneath said opening having parallel angle guide-strips secured thereto, ejectors comprising each two vertical bars connected at their upper ends by a cross-bar and having grooves in the lower ends of said vertical bars into which said guide-strips fit, and set-screws for holding the ejectors in any desired position on the support.

21. In a machine for molding building-blocks, the combination with a press portion, of an extension-platform having an opening therein, a support beneath said opening, a gear-rack guided for vertical movement to which said support is secured, block-ejectors carried on said support, a gear-segment meshing with said gear-rack, a shaft on which said gear-rack is mounted, an operating-lever secured to said shaft, a sector on the platform, and a dog on the operating-lever engaging said sector.

22. In a machine for molding building-blocks, the combination of a press, a mold for containing the material to be molded, a fixed extension onto which the mold is to be moved after a block is molded, and means for ejecting the molded block from the mold after the latter has been moved onto said fixed extension.

In testimony whereof I have affixed my signature in the presence of two subscribing witnesses.

GEORGE F. FISHER.

Witnesses:
 EMIL NEUHART,
 MAY F. SEWERT.